June 24, 1958 R. H. BETER ET AL 2,840,801

MAGNETIC CORE INFORMATION STORAGE SYSTEMS

Filed June 29, 1955 2 Sheets-Sheet 1

INVENTORS.
WILLIAM E. BRADLEY
RALPH H. BETER
MORRIS RUBINOFF
BY
Allen V. Hazeltine
ATTORNEY

MAGNETIC CORE INFORMATION STORAGE SYSTEMS

Filed June 29, 1955 2 Sheets-Sheet 2

INVENTORS.
WILLIAM E. BRADLEY
RALPH H. BETER
MORRIS RUBINOFF
BY Allen V. Hazeltine
ATTORNEY 2,840,801

MAGNETIC CORE INFORMATION STORAGE SYSTEMS

Ralph H. Beter, Philadelphia, William E. Bradley, Clifton Heights, and Morris Rubinoff, Sharon Hill, Pa., assignors to Philco Corporation, Philadelphia, Pa., a corporation of Pennsylvania Application June 29, 1955, Serial No. 518,732

19 Claims. (Cl. 340—174)

This invention relates to information storage systems and more particularly to magnetic core information storage systems for use in digital computers or the like.

Magnetic cores having hysteresis loop characteristics may be employed to store binary information. The storage principle of magnetic cores is now well known: a core of magnetic material having a nearly rectangular hysteresis loop is magnetized to saturation with the lines of flux passing in one direction to represent certain information and is magnetized to saturation with the flux passing in the opposite direction to represent other information. The rectangular hysteresis loop characteristic causes the flux in the core to remain at or near the saturation value after the magnetizing force has been removed. In representing binary information, flux in one direction represents a "one" and flux in the opposite direction represents a "zero." The direction of the flux may be sensed by surrounding the core with two independent windings, one a magnetizing winding and the other a sensing winding. These windings should be linked essentially only by the flux in the core. If a current of sufficient magnitude to cause saturation of the core is passed through the magnetizing winding in a reference direction and no appreciable signal appears in the sensing winding, it is an indication that the flux in the magnetic core was already in the reference direction. If an appreciable signal occurs in the sensing winding it is an indication that the flux was initially in a direction opposite to the reference direction but has been changed towards the reference direction by the magnetizing current. Information may be stored in the magnetic core by passing a current through the magnetizing winding in the proper direction to establish appreciable magnetization in the desired direction in the core.

Computer circuits have reached such a size and complexity that large main memory sections are required. In larger memories the number of cores may approach half a million. In order to reduce the number and complexity of selection, driving and sensing circuits which are necessary first to store the information in these cores and then to sense this information at some later time, it has become customary to arrange the magnetic cores in the form of a matrix. The individual cores in the matrix may be selected by selecting the row and column in which the particular core is located. With the cores arranged in this manner it is possible to use fewer amplifiers than would be required in a memory system in which the cores are individually selected. If a coincident current technique is employed in selecting the desired core the current supplied to the cores of a row or a column must be controlled within very narrow limits. The power requirements for the amplifier and the tolerances on current necessitated by the coincident current technique make that technique increasingly uneconomical or otherwise undesirable as they are applied to progressively smaller-capacity memory systems. The use of a single current, rather than combined currents, to produce core magnetism in one direction or the other can reduce the problem of tolerances on currents. In smaller memory systems the use of more but lower powered amplifiers may be more economical. Even if they are not more economical, a small increase in cost may be justified provided the memory system operates faster or with greater reliability or in such a manner that the circuits associated therewith can be reduced in complexity. While, in theory, the matrix principle could be employed with even a very small number of cores, for example four, it has been found in practice that it is impractical to employ this principle in memory sections having a small number of cores.

Therefore it is an object of the present invention to provide a simple economical storage system employing magnetic core storage units.

It is a further object of the present invention to provide a simple novel storage unit in which magnetic cores are individually selected in a manner which increases the speed and reliability of the memory system.

Another object of the invention is to provide a memory system in which the functions of reading, writing and regeneration are separately controlled.

Still another object of the invention is to provide a memory system which may be arranged to perform directly some of the functions normally performed in the arithmetic section of a computer.

In general the invention comprises a plurality of magnetic core storage elements, each having a magnetizing winding and a sensing winding. One row of magnetic core storage elements is provided for each word to be stored. As used herein the term "word" refers to a group of digits representing certain information. The number of storage units in each row is equal to the number of digits in the longest word to be stored in that row. Preferably an equal number of storage elements are included in each row. A plurality of bi-stable circuits, one for each digit in the longest word to be stored, are provided for receiving information from a generating source, for example the arithmetic section of a computer, and for transferring this information to the individual storage elements. The magnetizing windings of all cores corresponding to a particular digit are connected between the two halves of the bi-stable element provided to receive and transfer that digit. A transistor switch is provided in series with each magnetizing winding as a means of selecting which one of the associated cores is to be energized by a bi-stable circuit at any particular time. The condition of the bi-stable circuit at the time the transistor switch is closed determines the direction that the magnetizing current will take as it flows through the magnetizing winding of the selected storage element. All of the sensing windings associated with the cores energized by the same bi-stable element are connected together, preferably in series, to provide means for sensing information stored in whichever core is selected. Means associated with the sensing winding are provided for reinserting information into the core during and after each read-out cycle.

It will become clear as the description of the invention proceeds that the following advantages are realized through the use of applicant's novel system. The functions of reading, writing and regeneration are each controlled by a single pulse or cycle. Therefore the time required to perform each of these operations is less for the present system than in systems requiring multiple or sequenced cycle control signals. The present system transfers data into the cores in a positive fashion. New information may be stored without first clearing the cores of previously stored information. A single current rather than two or more coincident currents is employed in writing information into the cores. For this reason the tolerances on this current may be relaxed. Another advantage of the invention is that the functions of reading, writing and regeneration are separately controlled. In the circuit of the present invention the individual selection of the cores with the attendant freedom from the interfering signals generated by half-selected cores makes it possible to arrange the sensing windings to provide unidirectional output pulses. Still another advantage of the invention is that the logical addition of a stored number and a second number may be performed directly in the memory system by proper programming of the signals supplied to the control inputs.

For a better understanding of the invention, together with other and further objects thereof, reference should now be made to the following detailed description which is to be read in conjunction with the accompanying drawings in which.

Figure 1:
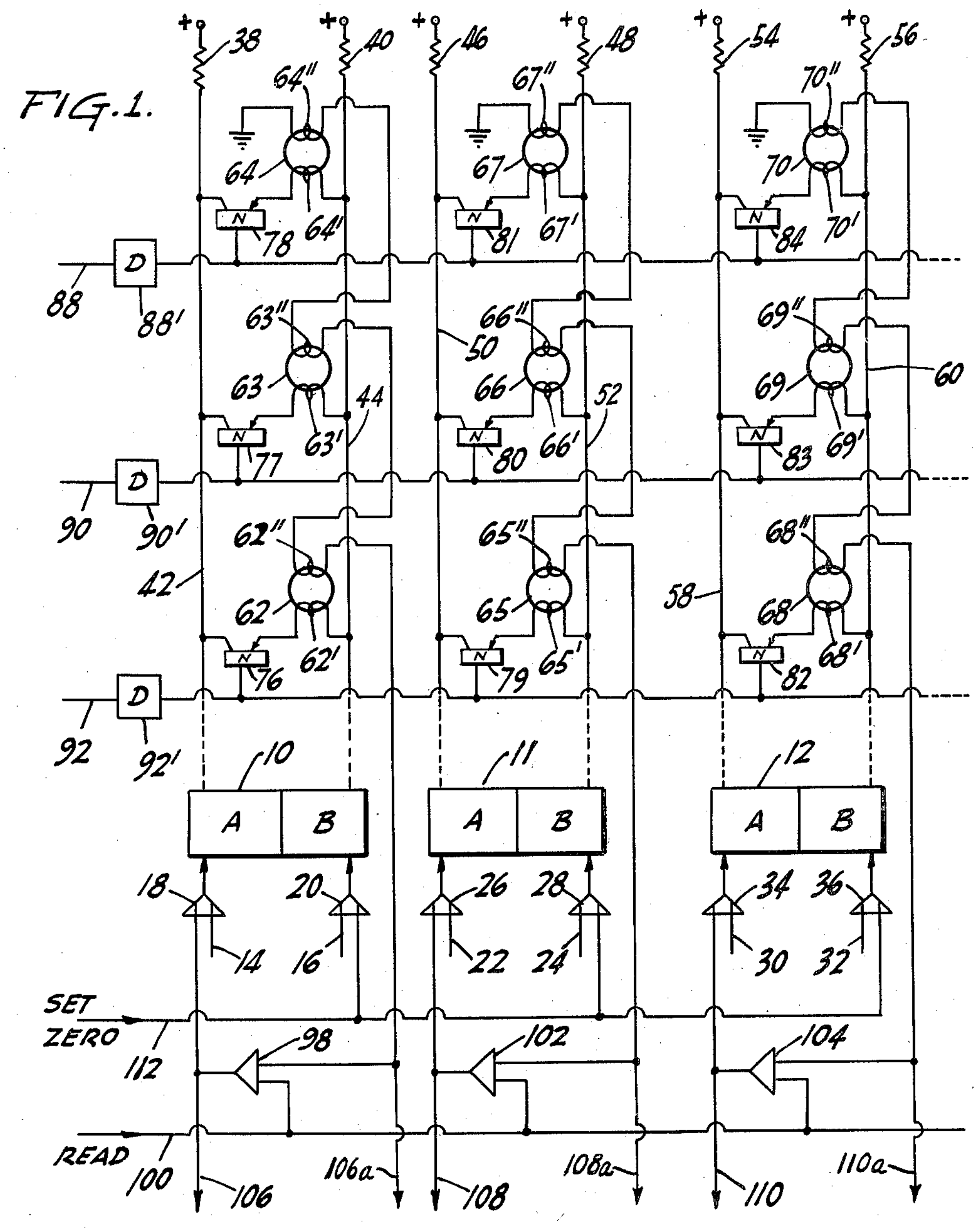
Fig. 1 is a schematic drawing of a system for storing three words of three digits each.

In the circuit of Fig. 1 control signals are supplied to the leads extending horizontally from the left hand side of the circuit. Information signals are received and supplied by leads extending in the vertical direction near the bottom of the circuit. Three bi-stable circuits 10, 11 and 12 are provided for receiving information from another section of the computer or similar information gathering or processing circuit. Information concerning one of the digits of the three digit number is supplied to bi-stable circuit 10 by way of leads 14 and 16. Lead 14 is connected to the A side of bi-stable circuit 10 through "or" gate 18 and lead 16 is connected to the B side of bi-stable circuit 10 through "or" gate 20. "Or" gates 18 and 20 may be any circuit which will provide an output signal in response to an input signal applied to any of several input circuits. In its simplest form it may be a simple transistor amplifier stage having more than one control input. The two halves of bi-stable circuit 10 have been labeled as the A and B sides for convenience in describing the operation of the invention. However, it is to be understood that in many instances the two halves of the bi-stable circuit will be identical. Leads 22 and 24 are connected to bi-stable circuit 11 through "or" gates 26 and 28, respectively. The information supplied over leads 22 and 24 represents the second digit in the number to be stored in the memory section. Similarly, leads 30 and 32 are connected to bi-stable element 12 through "or" gates 34 and 36, respectively. Information supplied over leads 30 and 32 represents the third digit in the word to be stored. Bi-stable circuits 10, 11 and 12 will not be discussed in detail since circuits of this type are well known in the art. These circuits may be Eccles-Jordan type trigger circuits employing either vacuum tubes or transistors. Transistor circuits have the advantages of smaller size and lower power consumption. Furthermore the supply potentials employed in transistor trigger circuits are such that the switching transistors in series with the magnetizing windings may be driven directly from the trigger circuits without any intervening voltage level changing circuits. As is well known, each half of an Eccles-Jordan trigger circuit comprises a vacuum tube or transistor provided with a load impedance. The anode of the tube or the equivalent point on the transistor will be at a low potential if that half of the trigger circuit is conducting owing to the drop in potential in the load resistor. This same point will be at a high potential if that half of the circuit is not conducting. Other bi-stable circuits provide similar means for causing a point in each half to be at a high or a low potential while the opposite condition obtains in the other half of the circuit. For convenience in describing the present invention, the load resistors 38 and 40 normally found in bi-stable circuit 10 have been shown separate from the block 10 and connected thereto through two conductors 42 and 44, respectively. Load resistors 46 and 48 of bi-stable circuit 11 are shown connected to the block 11 by conductors 50 and 52. Resistors 54 and 56 are the load resistors for bi-stable circuit 12 and are connected to block 12 by way of conductors 58 and 60.

The memory circuit shown in Fig. 1 includes nine magnetic cores numbered 62 through 70 inclusive. Cores 62 through 64 are associated with bi-stable circuit 10. Cores 65 through 67 are associated by bi-stable circuit 11 and cores 68 through 70 are associated by bi-stable circuit 12. Core 62 is provided with a magnetizing winding 62' and a sensing winding 62''. Cores 63 through 70 are provided with similar magnetizing windings and similar sensing windings. The magnetizing windings have been given prime numbers corresponding to the number of the core and the sensing windings have been given double prime numbers corresponding to the number of the core. The core material for all of these cores preferably has the well known rectangular hysteresis loop characteristic.

Winding 62' on core 62 is connected between conductors 42 and 44 through the emitter-collector circuit of a transistor 76. Windings 63' and 64' are similarly connected between conductors 42 and 44 through the emitter-collector circuits of transistors 77 and 78, respectively. For reasons which will appear later, transistors 76 through 78 should be capable of passing current both from the emitter to the collector and from the collector to the emitter. Alternatively two transistors having their emitter-collector circuits in parallel but with the collector of one connected to the emitter of the other may be employed. The bases of the two transistors should be connected together. The conducting path should be a low impedance if the base is properly biased and should be a high impedance when the base is not so biased. In some instances, in order to increase the symmetry of the circuit, it may be desirable to split the magnetizing windings 62', 63' and 64' and connect the emitter-collector circuits of the transistors 76 through 78, respectively, between the two parts of the respective windings.

In a computer the location of a storage element or a group of storage elements is known as the "address" of the element or group. The "address" signal may be in the form of a binary code of electrical pulses which will be processed by a suitable switching circuit to provide an activating signal on an address conductor associated with the storage element or group of storage elements. In the circuit of Fig. 1 these activating signals are supplied by way of address conductors 88, 90 and 92 at the left of the circuit. Only one address conductor is energized at a time, the particular line being energized being determined by appropriate switching circuits preceding conductors 88, 90 and 82. Conductor 88 is connected to the bases of transistors 78, 81 and 84, respectively, through driver stage 88'. Similarly, conductor 90 is connected to the bases of transistors 77, 80 and 83 through driver stage 90' and conductor 92 is connected to the bases of transistors 76, 79 and 82 through driver stage 92'. If only three transistors are to be driven from each of the address conductors, it may be possible to drive the transistors directly from the conductors 88, 90 and 92. However, if the memory circuit is arranged to store numbers having a relatively large number of digits, for example 10 or more, it may be necessary to provide some form of power amplification between conductors 88, 90 and 92 and the transistors associated therewith. This power amplification may be provided by transistor driver stages 88', 90' and 92'.

The sensing winding 62″, 63″ and 64″ associated with magnetic cores 62, 63 and 64 are connected in series. The connection of these windings is such that a change in flux from the remanence state representing a "1" to the remanence state representing a "zero" in any core produces an output pulse of the same polarity as that produced by a similar change in flux in any other core. For convenience this connection is hereinafter referred to as a series aiding relationship. One end of this series connection is returned to a reference voltage, or to ground as shown in the drawings, and a second end is connected as one input to an "and" gate 98. An "and" gate is a circuit which provides an output signal only upon the simultaneous appearance of an input signal at all of its input circuits. "And" gates are also known in the art as coincidence circuits and may comprise an amplifier stage having two control elements, either of which is capable of rendering circuit inoperative to pass a signal. The output of "and" gate 98 is connected to a second input of "or" gate 18. It should be noted that "or" gate 18 merely functions to permit signals from two different sources to be supplied to a single input of bi-stable circuit 10 without interaction between these signals. Usually this is accomplished by providing some sort of active circuit element such as a transistor or a vacuum tube in "or" gate 18 to provide the desired isolation. However, it is possible to use an entirely passive network made up of suitable resistors, diodes, or both, to accomplish the same result. The second input to "and" gate 98 is provided by way of conductor 100. Conductor 100 is connected to a suitable source of signals (not shown) which provides a signal whenever it is desired to read information out of the memory storage unit. Conductor 100 also supplies "read" signals to "and" gates 102 and 104. These "and" gates may be similar in construction to "and" gate 98. Sensing coils 65″, 66″ and 67″, which are wound on the cores associated with bi-stable circuit 11, are connected in series between ground and a second input of "and" gate 102. Similarly, sensing windings 68″, 69″ and 70″, associated with bi-stable circuit 12, are connected between ground and a second input of "and" gate 104. Output signals are obtained by way of conductors 106, 108 and 110 associated with the outputs of "and" gates 98, 102 and 104, respectively. Auxiliary outputs $106^a$, $108^a$ and $110^a$ connect directly to the sensing windings. A second input conductor 112 which connects with a second input of "or" gates 20, 28 and 36 completes the circuit of Fig. 1.

The circuit of Fig. 1 operates in the following manner. Any condition of information storage in the circuit of Fig. 1 may be assumed since it is not necessary to clear previously stored information before storing new information in the circuit. Assume that the binary number 101 is to be stored in the memory unit at the address associated with conductor 92. The circuits associated with leads 14 and 16 are such that if a pulse is present on lead 14 there will be no pulse present on lead 16 and vice versa. It will be assumed that a "one" is inserted into bi-stable circuit 10 when a pulse is supplied to lead 16. It will be assumed further that a pulse on lead 16 causes the A side of block 10 to be at a high potential and the B side to be at a low potential. Thus the information contained in the instantaneous pulses present on leads 14 and 16 is stored for a time in bi-stable element 10. The fact that the A side of bi-stable element 10 is at a high potential and the B side is at low potential assumes that the A side of bi-stable element 10 is cut off so that no anode current is flowing through load resistor 38. It also assumes that the B side of bi-stable circuit 10 is conducting so that anode current is being drawn through load resistor 40, dropping the potential at the B side of the bi-stable circuit. The designation of these potentials as "high" and "low" is an arbitrary one but one which aptly describes the potential at the junction of the load resistor and the switching element in an Eccles-Jordan or similar trigger circuit. In some descriptions of bi-stable circuits the "high" potential is sometimes referred to as a "positive" signal, i. e. it is positive with respect to the "negative" or low potential. This terminology is avoided here since transistorized trigger circuits may employ a negative supply potential and a "high" potential in this case is a potential which is more negative than the "low" potential. Of course the direction of the current through the magnetizing winding representing either a "one" or a "zero" will be different if a negative supply potential is employed than it would be if a positive supply potential is employed but, as suggested earlier, the selection of a reference direction for the current is purely an arbitrary one. To simplify the explanation which follows without limiting the invention to a particular form of bi-stable circuit, it will be assumed that current always flows from the "high" potential to the "low" potential.

Two inputs have been shown to each of the bi-stable circuits 10, 11 and 12. However, some bi-stable circuits may be set to either condition of operation by applying either a high or a low potential to a single input lead.

Under the conditions assumed, the "zero" supplied by way of leads 22 and 24 will cause the A side of bi-stable circuit 11 to be at a low potential and the B side to be at a high potential. Since the third digit is a "one," a signal supplied by way of leads 30 and 32 will cause the A side of bi-stable circuit 12 to be at a high potential and the B side to be at a low potential. With the bi-stable circuits in the conditions noted above, a pulse signal is supplied by way of conductor 92 to provide storage of the information in cores 62, 65 and 68. Conductor 92 is selected by the programming circuit which has knowledge of the address location at which the desired information is to be stored. The pulse signal supplied to conductor 92 conditions transistors 76, 79 and 82 for the passage of a signal in either direction. That is, these transistors may be considered as two-way devices which are rendered conductive in either direction, or non-conductive, by a suitable signal supplied to the base. Not all transistors conduct sufficiently well in the collector-emitter direction to be employed in the circuit of Fig. 1. However, several forms of transistors which are now commercially available, for example some forms of surface barrier transistors, exhibit the desired relative low impedance characteristic in the collector-emitter direction. As mentioned above, transistors may be employed in parallel. Energization of transistor 76 by the signal on conductor 92 permits current to flow through load resistor 38, conductor 42, transistor 76, magnetizing coil 62′ and conductor 44 to the B side of bi-stable circuit 10, and then through the B side of bi-stable circuit 10 to ground. This will cause core 62 to be magnetized in a direction which is representative of a stored "one." Note that only the core at the selected address location is energized. Cores 63 and 64 are not even partially energized since transistors 77 and 78 act as open switches in series with magnetizing windings 63′ and 64′.

Current will also flow through load resistor 54, conductor 58, transistor 82, magnetizing winding 68′, conductor 60 and the B side of bi-stable circuit 12 in the direction to indicate a "one" since the third digit of the number to be stored is also a "one." In the circuit associated with bi-stable circuit 11, the current in the magnetizing coil 65′ flows through load resistor 48, conductor 52, magnetizing winding 65′, transistor 79, conductor 50 and through the A side of bi-stable circuit 11 to ground. Since the direction of flow in magnetizing winding 65′ is opposite to that in magnetizing windings 62′ and 68′, core 65 will be energized in a direction which indicates a stored "zero." Upon the termination of the address signal on conductor 92 the number 101 is stored in cores 62, 65 and 68 until it is replaced by new information. The rectangular hysteresis loop characteristic of cores 62, 65 and 68 will cause the residual magnetization of these cores at the termination of the address signal on conductor 92 to be substantially equal to the saturation flux which resulted from the magnetization current flowing through coils 62', 68' and 65'.

A second word now can be read into the storage unit by resetting bi-stable circuits 10, 11 and 12 to indicate the digits of the new word and then energizing address conductor 88 or 90. The resetting of bi-stable circuits 10, 11 and 12 will not affect the information stored in cores 62, 65 and 68 unless address conductor 92 is also energized.

Information is read out of the memory system of Fig. 1 in the following manner. Bi-stable circuits 10, 11 and 12 are first set to indicate all "zeros" by a signal supplied by way of conductor 112 or by any other suitable means. A signal is supplied by way of conductor 100 to condition "and" gates 98, 102 and 104 to pass a signal if a second signal is supplied to the other input of each of these "and" gates. The address conductor of the number to be sensed is then energized. Assume that the information stored at the address associated with conductor 92 is to be sensed. Conductor 92 is energized, which again renders transistors 76, 79 and 82 capable of passing a current in either direction. Since core 62 was originally magnetized in the direction representing a "one," the current through magnetizing winding 62' will now be in a direction to reverse the direction of flux in this core. This reversal of the flux in core 62 induces a signal in sensing winding 62''. Since cores 63 and 64 are not energized, the signal in sensing winding 62'' will be the only signal induced in this series sensing circuit. The output signal representing a "one" will appear at conductor 106 at the output of "and" gate 98. The signal at the output of "and" gate 98 is also supplied to the A side of bistable circuit 10. This signal resets bi-stable circuit 10 to indicate a "one." The resetting of bi-stable circuit 10 prior to the termination of the address signal on conductor 92 causes a second reversal in the direction of the current in magnetizing winding 62'. The magnetization of core 62 is returned by the reversed current to the condition representing a "one." If this step of restoring the original direction of flux in core 62 were not taken, stored information would be destroyed each time a number was read out of the memory system. This operation is usually referred to as regeneration. This second reversal of flux in core 62 will induce a second signal in sensing winding 62''. However, this second signal will have a polarity opposite to that of the first signal so it will not be passed by "and" gate 98. In certain instances it may be possible to so select the constants of the circuit that the reversal of current will take place before the initial current has reached its full value or before the core magnetism has fully reversed. If this condition can be met the result will be a faster operating cycle than the one which presents full reversal of the core magnetism.

When transistor 79 is rendered capable of passing a current, a current flows through magnetizing winding 65' in a direction to energize core 65 to store a "zero." However, since core 65 is already magnetized substantially to saturation in this direction, practically no change in flux occurs in this core. Under these condiitons no signal will be induced in sensing winding 65'' and no signal will be supplied to the second input of "and" gate 102. The absence of a signal on conductor 108 indicates that a "zero" was stored in the sensed core. Since no signal appears in the output of "and" gate 102, bi-stable circuit 11 will remain in the state in which it was placed by the signal on conductor 112 and the flux in core 65 will continue to correspond to the storage of a "zero." The operation of bi-stable circuit 12 and the circuits associated with core 68 are identical to that of the circuits associated with core 62 and bi-stable circuit 10. The output "one" which was stored in core 68 appears at conductor 110. It will be obvious to those skilled in the art that a word may be read out of rows of cores associated with conductors 88 and 90 in exactly the same manner as that described above.

Since conductor 100 is energized only when a signal is to be read out of the memory storage unit, a new word can be written into the first horizontal row by resetting bi-stable elements 10, 11 and 12 to represent this word and then energizing address conductor 92. Any changes of flux which occurs in cores 62, 65 and 68 will not appear as signals at output connections 106, 108 and 110 since it is assumed that no signal is supplied to the second input of "and" gates 98, 102 and 104.

If it is desired to read and erase without regeneration, connection may be made directly to auxiliary conductors 106ª, 108ª and 110a. In reading without regeneration the read pulse normally supplied to conductor 100 is omitted. Connection to either conductors 106, 108 and 110 or conductors 106ª, 108ª and 110ª is made by suitable switching circuits (not shown) which are controlled by the programming of the computer.

The operations just described are those of writing a word into the memory section and then reading a word from the memory section. If the output signals are taken directly from the sensing windings by way of output connections 106ª, 108ª and 110ª without passing through "and" gates 98, 102 and 104 the step of logical addition of a word in the memory section and a second word may be performed without any further modification of the circuit.

Logical addition obeys the following rules:

| | | | |
|---|---|---|---|
| 0 | 0 | 1 | 1 |
| +0 | +1 | +0 | +1 |
| 0 | 1 | 1 | 0 |

Now suppose a "zero" has been written into core 62 in the manner described above. Suppose further that it is now desired to perform the step of logical addition of the digit stored in core 62 and a second digit supplied to leads 14 and 16. If the second digit is a "zero," no change in flux will take place upon the energization of address conductor 92. If no appreciable change in flux takes place in core 62, no appreciable signal will be induced in the sensing winding circuit. Thus it can be considered that the memory section has performed the logical addition of 0+0 and provided the logical sum (zero) to the sensing winding. No read signal is supplied to lead 100 during this operation.

If a "zero" has been written into core 62 and then a "one" is to be written in, a change in flux will take place in core 62 which will provide an output signal in the sensing winding. This corresponds to the second rule of logical addition that 0+1=1. The signal developed in performing the addition of 0+1 will be of different polarity than the other output signals of the system of Fig. 1. However, full wave rectifier circuits for converting bipolar pulses to pulses of a single desired polarity have been developed in connection with coincident current memory sections and can be employed in connection with the system of Fig. 1 if pulses of one polarity are required.

If a "1" is originally written into one of the cores and a "zero" is then writen in, a change of flux will occur in the core in the manner described above and an output signal will be present in the sensing winding circuit.

If a "1" is stored in one of the cores and a second "one" is written into the core, no appreciable change in flux will occur and no appreciable signal will be induced in the sensing winding circuit. Thus all four rules for the logical addition of a "zero" and a "one" are obeyed by the system of Fig. 1.

The system shown in Fig. 1 is arranged for parallel operation, that is, all digits of a word are written into or read out of the memory system simultaneously. Fig.

Figure 1A:
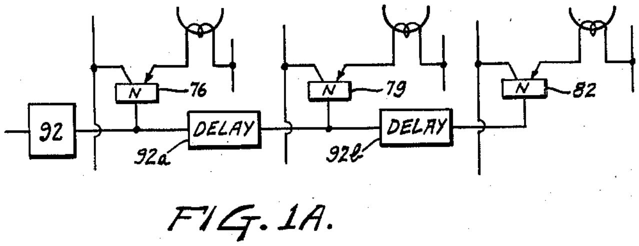
Fig. 1A illustrates a modification of a portion of the system of Fig. 1.

1A illustrates one manner in which one or more of the address locations of the system of Fig. 1 may be modified to permit serial operation of the memory system. The only change required is that of inserting delay means 92a and 92b in the address lines supplying the switching transistors. Only one address location is shown in Fig. 1A but similar modification may be made at all address locations shown in Fig. 1 to provide serial operation at all address locations. The time spacing between consecutive output pulses when the system is arranged for serial operation is determined by the delay times of delay means 92a and 92b. The "read" pulse supplied to lead 100 may be made to be of sufficient duration to permit the address signal to be propagated to all digit columns before the termination of the "read" pulse or, alternatively, similar delay means may be inserted in series with conductor 100 between "and" gates 98 and 102 and between "and" gates 102 and 104 so that the "read" pulse is applied sequentially to these "and" gates. A second way of obtaining the output signals in serial form comprises arranging the circuits as shown in Fig. 1 except for the insertion of suitable delay means in series with each sensing winding circuit. The delay means in the first digit column would have one unit of delay, the one in the second digit column would have two units of delay, etc. Various other modifications falling within the scope of the invention may be made in the circuit shown in Fig. 1. The most obvious modification is the addition of other vertical columns of circuits to accommodate more digits in the words to be stored. Another obvious modification is the addition of horizontal rows of circuits to permit storage of a greater number of words. As mentioned earlier, some of the outstanding advantages of the system of Fig. 1 are that it can be arranged for either serial or parallel operation, the functions of reading, writing and regeneration are separate operations and each is controlled by a separate signal, and the separate signals are a single cycle each, thus permitting very rapid cycling of the memory system. Other equally important advantages are that the cores are individually selected and information is positively inserted, the output signals, with one exception, are all of the same polarity and the output signals are free of the noise generated in partially selected cores.

Figure 2:
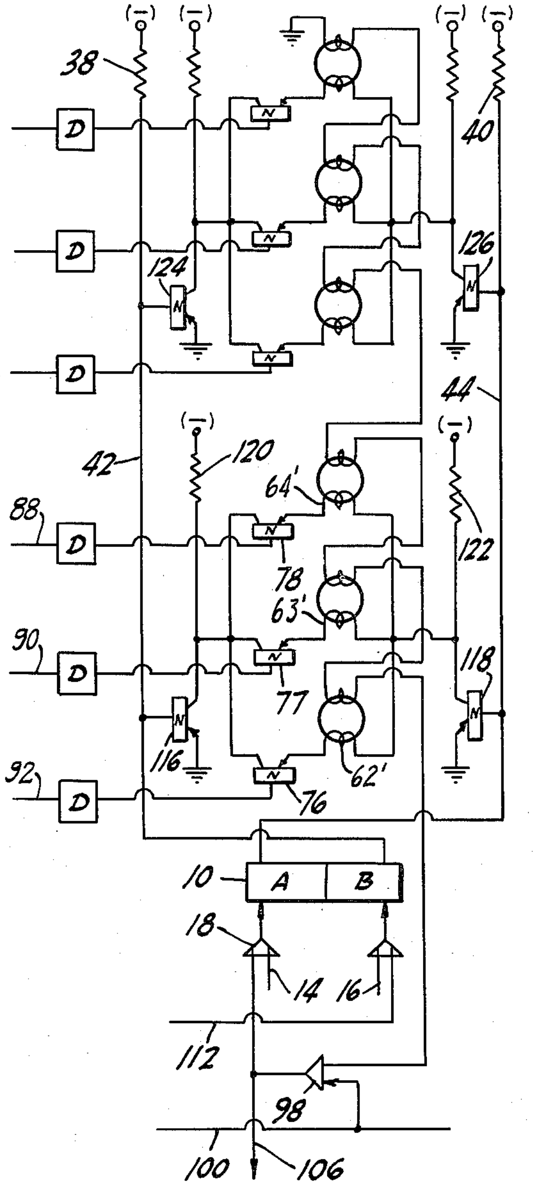
Fig. 2 is a schematic drawing of a modified form of one digit column of the system of Fig. 1 in which individual transistor switches are controlled by the bi-stable circuits through driver transistors.

The circuit of Fig. 2 is similar to a single digit column of Fig. 1 except that bi-stable circuit 10 does not drive the magnetizing coils 62′, 63′ and 64′ directly. Instead, conductor 42 is connected to the base of a driving transistor 116 and conductor 44 is connected to the base of driving transistor 118. The connections from conductors 42 and 44 to the A and B sides of bi-stable circuit 10 have been reversed in the circuit of Fig. 2 so that the direction of magnetizing currents through the magnetizing cores 62′, 63′ and 64′ will remain the same despite the signal inversion provided by the transistors 116 and 118. However, this reversal of the connections is not strictly necessary since the choice of direction of magnetic flux which represents a "one" or a "zero" is purely arbitrary. The emitters of transistors 116 and 118 are connected to ground and the collectors are connected to a source of suitable supply voltage by way of load resistors 120 and 122, respectively. The supply voltage is indicated as negative by the minus sign (−) in Fig. 2. However, by reversal of transistors 116 and 118 or by the choice of a different type of transistor, a positive supply may be used. It would be possible to employ a vacuum tube driver circuit in place of either or both transistors 116 and 118. However, this would involve the use of resistor networks or the like for establishing the proper voltage levels in the circuit. It has been found that with a suitable choice of transistors it is possible to drive one transistor directly from another without the necessity of intervening voltage changing circuits. The collectors of transistors 76, 77 and 78 are connected to the collector of transistor 116. One end of each of magnetizing windings 62′, 63′ and 64′ is connected to the collector of transistor 118. Transistors 124 and 126 are provided for driving the additional magnetic cores shown but not numbered in Fig. 2. The connection and operation of these cores will not be discussed since they are identical to the connection and operation of cores 62, 63 and 64 and the circuits associated therewith. The six cores in Fig. 2 provide six addresses for storing a single digit. Storage for additional digits in each number may be provided by duplicating the appropriate parts of the circuit of Fig. 2 for as many digits as there are to be stored. The circuit of Fig. 2 operates in a manner which is very similar to the operation of the system of Fig. 1. If the A half of bi-stable circuit 10 is in a non-conducting state and the B half is in a conducting state, the base of transistor 116 will be at a low negative potential causing this transistor to be cut off. This will place the emitter of transistor 116 at a high negative potential. The high potential at the A side of bi-stable circuit 10 will cause transistor 118 to be conductive and the collector of this transistor to be at a low negative potential. It can be seen that, upon the energization of any one of address conductors 88, 90 and 92, current will flow through magnetizing coils 64′, 63′ or 62′ in the same direction as it did in the circuit of Fig. 1. The circuit of Fig. 2 has the advantage that the bi-stable circuit 10 does not have to drive each individual switching transistor. It has only to drive the driving transistors 116 and 124, or 118 and 126. Each driving transistor in turn may drive as many as five or more switching transistors. The use of the driving transistors has the further advantage that the bi-stable circuit 10 is isolated from any transients which may occur in the magnetizing windings as a result of changing flux in the cores.

Figure 3:
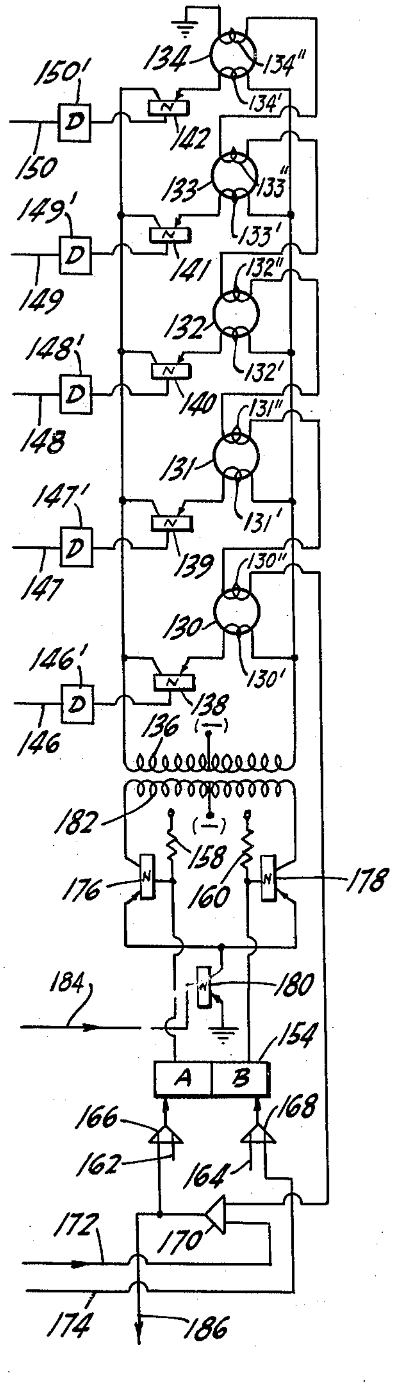
Fig. 3 is another modified form of a digit column of the system of Fig. 1 employing a transformer circuit for driving the switching transistors.

The circuits of Figs. 1 and 2 employ direct coupling between the bi-stable circuits and the magnetic cores or driving transistors. The circuit of Fig. 3 differs from these circuits in that transformer coupling is employed. The use of a transformer to obtain an impedance transformation requires certain changes in the arrangement of the circuit. The circuit of Fig. 3 provides five addresses for storing a single digit. Storage for additional digits at any address is provided by duplicating the circuit of Fig. 3 as many times as there are digits to be stored. In Fig. 3, 130 to 134 are the magnetic cores which provide the actual storage of the information. Windings 130′ to 134′ are the magnetizing windings associated with these cores. Windings 130″ to 134″ are the sensing windings associated with these cores. One side of each of the magnetizing windings is connected to one terminal of the transformer secondary 136. The other terminal of each of magnetizing windings 130′ through 134′ is connected to a second terminal of transformer secondary 136 through the emitter-collector circuits of transistors 138 to 142, respectively. An intermediate tap of secondary 136 is returned to a negative supply potential schematically illustrated in Fig. 3 by the minus sign (−). The negative potential serves as the emitter and collector potential of the transistors 138 to 142. If desired, a relatively high potential may be employed and a resistor inserted between the source of the current and tap 136 to limit or determine the current that will flow if one of transistors 138 to 142 is energized to cause it to appear as a low impedance. Signals for controlling transistor 138 to 142 are supplied by way of address conductors 146 through 150, respectively. Amplifier stages 146′ to 150′ may be employed if necessary in driving transistors 138 through 142. As explained in connection with the description of the circuit of Fig. 1, conductors 146 through 150 will usually be connected to a suitable switching unit in the computer which energizes only one of the conductors at a time and then only if a word is to be written into or read from the memory section. As suggested above, the programming section of the computer is arranged to select a conductor which corresponds to an address at which there is information to be stored or from which the information is to be sensed or extracted. Bi-stable circuit 154 in Fig. 3 performs the same function as any one of the bi-stable elements 10, 11 or 12 of the circuit of Fig. 1. The load resistors 158 and 160 of bi-stable circuit 154 have been shown separate from the block although they are normally considered part of the bi-stable circuit. Again bi-stable circuit 154 with load resistors 158 and 160 may be a conventional Eccles-Jordan trigger circuit. Preferably this circuit will employ transistors to save power and space but it may employ vacuum tubes if desired. Information to be stored is supplied to bi-stable circuit 154 by way of conductors 162 and 164 which connect to the A and B sides of bi-stable element 154 through "or" gates 166 and 168. The sensing windings 130'' to 134'' are connected in series between ground and a first input of "and" gate 170. The output of "and" gate 170 is connected to a second input of "or" gate 166. Conductor 172 is connected to a second input of "and" gate 170 and provides means for supplying a "read" signal to the memory circuit. A "zero" set signal may be supplied to a second input of "or" gate 168 by way of conductor 174. It will be noted that the input connections of bi-stable circuit 154 are identical to those of corresponding circuits of Figs. 1 and 2. The output of the A side of bi-stable circuit 154 is connected to the base of a power transistor 176. Similarly, the output of the B side of bi-stable circuit 154 is connected to the base of a second power transistor 178. The emitters of transistors 176 and 178 are connected to ground through the emitter-collector circuit of switching transistor 180. The collectors of transistors 176 and 178 are connected to the two ends respectively of transformer primary 182. The center tap of transformer 182 is connected to a suitable negative supply potential for transistors 176 and 178. This potential may be different from the one used for the secondary winding. Conductor 184, connected to the base of switching transistor 180, provides means for supplying a "demand" signal to switching transistor 180.

The circuit of Fig. 3 operates in the following manner. Suppose that a "one" is to be stored in core 130. Under the conditions assumed in connection with the description of the operation of the circuit of Fig. 1, information indicating that a "one" is to be stored is represented by conductor 162 being momentarily at a low potential and conductor 164 being momentarily at a high potential. Also under the conditions assumed above, the momentary low potential on conductor 162 will cause the A side of bi-stable circuit 154 to be non-conducting and the B side to be conducting. This will place the lower end of load resistor 158 at a high potential and the lower end of load resistor 160 at a low potential. The high potential on the base of power transistor 176 will render this transistor capable of passing a current. The low potential on the base of transistor 178 will cause this transistor to be cut off. An address signal is supplied to conductor 146 which renders transistor 138 capable of passing a current. However, no current will flow through transistor 138 or magnetizing winding 130' upon the application of the address signal on conductor 146 since as yet there is no signal induced in the secondary winding 136. After bi-stable element 154 has been set to its desired state and the address signal has been supplied to the selected address conductor 146, a pulse signal is supplied by way of conductor 184 to the base of transistor 180 which causes this transistor to become substantially a short circuit between emitter and collector. Upon the application of this "demand" signal to the base of transistor 180, current will flow from the center tap of primary 182 through transistor 176 and transistor 180 to ground. The current in the left half of the primary winding 182 will induce a signal in the secondary winding 136 which will cause a current to flow through magnetizing winding 130' and transistor 138. The flow of current in magnetizing winding 130' will be in such a direction as to magnetize core 130 so that the residual flux in this winding will indicate that a "one" has been stored. The "demand" signal on conductor 184 and the address signal on conductor 146 may then be removed and the flux will remain at substantially the saturation value in core 130, owing to the substantially rectangular hysteresis loop characteristic of the core material.

Suppose now that it is desired to read the information stored at the address corresponding to conductor 146. A "zero" set signal is supplied by way of conductor 174 which causes the B side of bi-stable element 154 to be cut off and the A side to be conducting. Under these conditions transistor 178 will be capable of passing current but transistor 176 will be cut off. The "read" signal is supplied to conductor 172 to condition "and" gate 170 to pass a signal if one occurs in any of the sensing windings connected to the second input of this "and" gate. Conductor 146 is again energized with an address signal which conditions transistor 138 to pass a current. Again no current will flow on the application of the address signal since there is no current induced in the secondary of transformer winding 136. A "demand" signal is supplied to conductor 184 which renders transistor 180 capable of passing current. Current will now flow from the center tap of transformer primary 182 through transistors 178 and 180 to ground. The current flowing in the right half of transformer primary 182 will induce a current in transformer secondary 136 which is in a direction opposite to that which originally magnetized core 130. The current in the opposite direction through magnetizing winding 130' will cause a reversal on the flux in core 130. This reversal on the flux in core 130 will cause a signal to be induced in sensing winding 130''. The signal induced in sensing winding 130'' will be passed through "and" gate 170 and appear as an output signal at conductor 186. A signal at the output of "and" gate 170 is also supplied to the A side of bi-stable circuit 154. This signal at the A side of bi-stable circuit 154 causes this bi-stable circuit to resume the condition indicating a "one." The reversal of the state of bi-stable circuit 154 will cause transistor 178 to be cut off and transistor 176 to be rendered conductive. Current will then reverse through the transformer primary 182 and the transformer secondary 136. Reversal of the current in transformer secondary 136 will reverse the current through magnetizing winding 130'. The reversal of current in magnetizing winding 130' will cause the flux in core 130 again to be in the direction which indicates a storage of a "one." The signals on conductors 146, 184 and 172 may then be removed as the desired information has been read out and the stored information has been reinserted in the core 130. The storage and the reading of the "zero" is similar to the operation just described except that if a "zero" is read, no change of flux will occur in core 130 and no output signal will appear at the output of "and" gate 170. It will be remembered that if the flux in core 130 is already in the direction indicating that a "zero" is stored, the subsequent energization of core winding 130' in a direction to indicate a second "zero" will cause substantially no change in the flux in core 130 since this is already substantially at the saturation value. If there is no change in flux in core 130 there will be no signal induced in the sensing winding 130''. If there is no signal induced in winding 130', there will be no reversal of the bi-stable circuit 154.

Again the circuit of Fig. 3 represents but one preferred embodiment of the invention employing transformer coupling. The circuit of Fig. 3 may be duplicated to provide as many digit columns as are required. The entire system may be arranged for either serial or parallel operation by proper choice of pulse lengths and pulse timing on the control inputs.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

We claim:

1. A memory system for binary-coded information comprising *n* pairs of signal conductors, where *n* is the number of digits in the longest word to be stored, means for causing a difference in potential to exist between the two conductors of each pair, means for controlling selectively the polarity of said potential difference, a difference of one polarity representing first information and a difference of the opposite polarity representing other information, a separate plurality of magnetic cores associated with each of said *n* pairs of signal conductors, each of said cores being provided with at least a magnetizing winding, an electrically controlled switching means connected in series with said magnetizing winding, and a sensing winding, said series combinations of magnetizing windings and switching means being connected in parallel between the two signal conductors associated therewith, thereby to form a plurality of digit columns, a plurality of address conductors to which signals for controlling said switching means may be supplied, each address conductor being coupled to a switching means in each of a plurality of said digit columns, means for connecting the said sensing windings in each of said digit columns in series relationship, said sensing windings of each digit column being so connected that a change in flux in any one of said magnetic cores of that digit column from the condition representing said first information to said condition representing said other information produces a signal of a first polarity in the sensing winding circuit of that digit column, and means associated with said sensing winding circuit and said means for controlling the polarity of the potential difference of the signal conductors in the same digit column for resetting the polarity of said signal conductors to indicate a selected one of said two pieces of information upon the occurrence of a preselected signal in said sensing winding circuit.

2. A memory system for binary-coded information comprising *n* bi-stable elements, where *n* is the number of digits in the longest word to be stored, each of said bi-stale elements having first and second output terminals, means for setting each of said bi-stable elements to represent selectively the binary digits "zero" and "one," the representation of a "one" being indicated by a difference in potential of a first polarity between said output terminals and the representation of a "zero" being indicated by a difference in potential of the opposite polarity between said output terminals, a separate plurality of magnetic cores associated with each of said *n* bi-stable elements, each of said cores being provided with at least a magnetizing winding, an electrically controlled switching means connected in series with said magnetizing winding, and a sensing winding, said series combinations of said magnetizing windings and switching means being connected in parallel between said two output terminals of said bi-stable element associated with the corresponding plurality of cores, each bi-stable element and the cores associated therewith forming a digit column, a plurality of address conductors to which signals for controlling said switching means may be supplied, each of said address conductors being coupled to a switching means in each of a plurality of said digit columns, means connecting said sensing windings in the same digit column in series relationship, said sensing windings of each digit column being so connected that a change in flux in any one of said magnetic cores of that digit column from the condition representing a "one" to a condition representing a "zero" produces a signal of a first polarity in the sensing winding circuit of that digit column, an "and" gate associated with each of said series connected sensing winding circuits, means for supplying a control signal to one input of each of said "and" gates, said series connected sensing windings being connected to a second input of the said "and" gate associated therewith, each of said "and" gates being arranged to provide an output signal on the simultaneous occurrence of a control signal and a preselected signal from said sensing winding, the output of each of said "and" gates being so connected to the bi-stable element in the same digit column that said last-mentioned bi-stable element is reset to one of said two polarities upon the occurrence of a signal at the output of said "and" gate.

3. A memory system for binary coded information comprising *n* bi-stable elements, where *n* is the number of digits in the longest word to be stored, each of said bi-stable elements having first and second output terminals, means for setting each of said bi-stable elements to represent selectively the binary digits zero and one, the representation of a "one" being indicated by a difference in potential of a first polarity between said output terminals and the representation of a "zero" being indicated by a difference in potential of the opposite polarity between said output terminals, a separate plurality of magnetic cores associated with each of said *n* bi-stable elements, each of said cores being provided with at least a magnetizing winding, a switching transistor having the collector-emitter circuit connected in series with said magnetizing winding, and a sensing winding, said series combinations of magnetizing windings and switching transistors being connected in parallel between said two output terminals of said bi-stable element associated with the corresponding plurality of cores, thereby to provide a plurality of digit columns, a plurality of address conductors to which an activating signal for said switching transistors may be supplied, each address conductor being coupled to the base of a transistor in each of said digit columns, means for connecting said sensing windings in the same digit column in series relationship, said sensing windings of each digit column being so connected that a change in flux in any one of said magnetic cores of that digit column from the condition representing a "one" to a condition representing a "zero" produces a signal of a first polarity in the sensing winding circuit of that digit column, and "and" gate associated with each of said series-connected sensing winding circuits, means for supplying a control signal to one input of each of said "and" gates, said series-connected sensing windings being connected to a second input of the "and" gate associated therewith, said "and" gates being arranged to pass a signal upon the simultaneous occurrence of a control signal and a signal from said sensing winding circuit, the output of said "and" gate being so connected to the bi-stable element in the same digit column that said last-mentioned bi-stable element is reset to indicate a "one" upon the occurrence of a signal at the output of the "and" gate associated therewith.

4. A memory system for binary-coded information comprising a bi-stable element having first and second output terminals, means for setting said bi-stable element to represent selectively the binary digits "zero" and "one," the representation of a "one" being indicated by a difference in potential of a first polarity between said output terminals and the representation of a "zero" being indicated by a difference in potential of the opposite polarity between said output terminals, a plurality of magnetic cores associated with said bi-stable element, each of said cores being provided with at least a magnetizing winding, a switching transistor having the collector-emitter circuit connected in series with said magnetizing winding, and a sensing winding, said series combinations of magnetizing winding and switching transistors being connected in parallel between said two output terminals, a plurality of address conductors to which an activating signal for said switching transistors may be supplied, each address conductor being coupled to the base of one of said transistors, means connecting said sensing windings in series relationship, said sensing windings being so connected that a change in flux in any one of said magnetic cores from the condition representing a "one" to a condition representing a "zero" produces a signal of a first polarity in said sensing winding circuit, and "and" gate associated with said series-connected sensing winding, means for supplying a control signal to one input of said "and" gate, said series-connected sensing windings being connected to a second input of said "and" gate, said "and" gate being arranged to pass a signal on the simultaneous occurrence of a control signal and a signal from said sensing winding circuit, the output of said "and" gate being so connected to the bi-stable element that said bi-stable element is reset to indicate a "one" upon the occurrence of a signal at the output of the "and" gate.

5. A memory system for binary-coded information comprising $n$ bi-stable elements, where $n$ is the number of digits in the longest word to be stored, each of said bi-stable elements having first and second output terminals, first means for setting each of said bi-stable elements to represent selectively the binary digits "zero" and "one," separately energizable means for setting all of said bi-stable elements to represent a selected one of said two values, "zero" and "one," the representation of a "one" being indicated by a difference potential of a first polarity between said output terminals and a representation of a "zero" being indicated by a difference in potential of the opposite polarity between said output terminals, a separate plurality of magnetic cores associated with each of said $n$ bi-stable elements, each of said cores being provided with at least a magnetizing winding, a switching transistor having the collector-emitter circuit connected in series with said magnetizing winding, and a sensing winding, said series combinations of magnetizing windings and switching transistors being connected in parallel between said two output terminals of said bi-stable element associated with the corresponding plurality of cores, thereby to form a plurality of digit columns, a plurality of address conductors to which a signal for controlling the conduction through said switching transistors may be supplied, each address conductor being coupled to the base of a transistor in each of a plurality of said digit columns, means connecting said sensing windings in the same digit column in series relationship, said sensing windings of each digit column being so connected that a change in flux in any one of said magnetic cores of that digit column from the condition representing a "one" to the condition representing a "zero" produces a signal of a first polarity in the sensing winding circuit of that digit column, an "and" gate associated with each of said series connected sensing winding circuits, means for supplying a control signal to one input of each of said "and" gates, means connecting said series connected sensing windings to a second input of the "and" gate associated therewith, said "and" gate being arranged to provide an output signal on the simultaneous occurrence of a control signal and a signal in said sensing winding circuit representative of the non-selected one of said two values, the output of said "and" gate being so connected to the bi-stable element in the same digit column that said last-mentioned bi-stable element is reset to provide a potential difference representative of said non-selected one of said two values upon the occurrence of a signal in the output of said "and" gate associated therewith.

6. A memory system as in claim 5, said memory system further comprising means associated with said address conductors for delaying by different amounts the control signals supplied to the switching transistors in selected ones of said digit columns, said delays being such that the switching transistors in the several digit columns are energized in sequence upon the application of a signal to an address conductor.

7. A memory system as in claim 5 wherein said means connecting said series-connected sensing windings to a second input of said "and" gate comprises delay means, said delay means having a different delay for each digit column.

8. A binary memory system comprising $n$ bi-stable elements, where $n$ is the number of digits in the longest word to be stored, each of said bi-stable elements having first and second output terminals, means for setting each of said bi-stable elements to represent selectively the binary digits "zero" and "one," separately energizable means for setting all of said bi-stable elements to represent binary digit "zero," the representation of a "one" being indicated by the difference potential of a first polarity between said output terminals and the representation of a "zero" being indicated by a difference in potential of the opposite polarity between said output terminals, a first and a second plurality of transistors associated with each of said bi-stable elements, each transistor having one terminal of its internal emitter-collector current path connected to ground and the other terminal of said internal current path returned to a source of supply potential through a load impedance, the base of each transistor in said first plurality being connected to said first output terminal of said bi-stable element, the base of each transistor in said second plurality being connected to said second output terminal of said bi-stable element, a separate plurality of magnetic cores associated with each of said $n$ bi-stable elements, each of said cores being provided with at least a magnetizing winding, a switching transistor having the collector-emitter circuit connected in series with said magnetizing winding, and a sensing winding, said series combinations of magnetizing windings and switching transistors being connected in parallel between said other terminal of said internal emitter-collector current path of one of said transistors in said first plurality and said other terminal of the internal emitter-collector current path of one of said transistors in said second plurality, thereby to provide a plurality of digit columns, a plurality of address conductors to which signals for controlling said switching transistors may be supplied, each address conductor being coupled to the base of a switching transistor in each of said digit columns, means connecting said sensing windings in the same digit column in series relationship, said sensing windings of each digit column being so connected that a change in flux in any one of said magnetic cores of that digit column from the condition representing a "one" to a condition representing a "zero" produces a signal of a first polarity in said sensing winding circuit of that digit column, an "and" gate associated with each of said series connected sensing winding circuits, means for supplying a control signal to one input of each of said "and" gates, each of said series connected sensing windings being connected to a second input of the "and" gate associated therewith, said "and" gate being constructed and arranged to provide an output signal in response to the simultaneous occurrence of a control signal and a preselected signal in the sensing winding circuit associated therewith, the output of said "and" gate being connected to said bi-stable element in the same digit column for causing said last-mentioned bi-stable element to be reset to a selected one of said two polarities upon the occurrence of a signal in the output of said "and" gate.

9. A binary memory system comrising $n$ bi-stable elements where $n$ is the number of digits in the longest word to be stored, each of said bi-stable elements having first and second output terminals, means for setting each of said bi-stable elements to represent selectively the binary digits "zero" and "one," the representation of a "one" being indicated by a difference in potential of a first polarity between said output terminals and the representation of a "zero" being indicated by a difference in potential of the opposite polarity between said output terminals, a transformer having a primary winding and a secondary winding, said primary and said secondary windings each having first and second end terminals and an intermediate terminal, the intermediate terminal of said two windings being connected to suitable sources of supply potential, a first and a second transistor, said first transistor having one terminal of its emitter-collector circuit connected to said first end terminal of said primary winding, said second transistor having the corresponding terminal of its emitter-collector circuit connected to said second end terminal of said primary winding, a third transistor, the second terminal of the emitter-collector circuit of each of said first and second transistors being connected to a first terminal of the emitter-collector circuit of said third transistor, the other terminal of the emitter-collector circuit of said third transistor being connected to ground, the bases of said first and second transistors being connected to said first and second output terminals respectively of said bi-stable element, means for supplying a control signal to the base of said third transistor, a separate plurality of magnetic cores associated with each of said $n$ bi-stable elements, each of said cores being provided with at least a magnetizing winding, a switching transistor having its collector-emitter circuit connected in series with said magnetizing winding, and a sensing winding, said series combinations of magnetizing windings and switching transistors being connected in parallel between said two end terminals of said secondary winding, each of said bi-stable elements and the associated magnetic cores forming a digit column, a plurality of address conductors, each address conductor being coupled to the base of a switching transistor in each of said digit columns, means for connecting said sensing windings in the same digit column in series relationship, said sensing windings of each digit column being so connected that a change in flux in any one of said magnetic cores of that digit column from the condition representing a "one" to a condition representing a "zero" produces a signal of a first polarity in said sensing winding circuit of that digit column, an "and" gate associated with each of said series connected sensing winding circuits, means for supplying a control signal to one input of each of said "and" gates, said series connected sensing windings being connected to a second input of the "and" gate associated therewith, each of said "and" gates being constructed and arranged to provide an output signal upon the simultaneous occurrence of a signal at said two inputs, the output of said "and" gate being connected to the bi-stable element in the same digit column for causing said last-mentioned bi-stable element to be reset to indicate a "one" upon the occurrence of a signal at the output of said "and" gate.

10. A binary memory system comprising $n$ bi-stable elements, where $n$ is the number of digits in the longest word to be stored, each of said bi-stable elements having first and second output terminals, means for setting each of said bi-stable elements to represent selectively binary digits "zero" and "one," separately energizable means for setting all of said bi-stable elements to represent the binary digit "zero," the representation of a "one" being indicated by a difference in potential of a first polarity between said output terminals and a representation of a "zero" being indicated by a difference in potential of the opposite polarity between said output terminals, a transformer having at least a primary winding and a secondary winding, first, second and third electrically controlled two terminal switch means, means connecting together one terminal of each of said three switch means, means connecting a second terminal of said first switch means to a first end terminal of said primary winding, means connecting a second terminal of said second switch means to a second end terminal of said primary winding and means connecting a second terminal of said third switch means to a point of reference potential, said first output terminal being connected to said first switch means to control the operation thereof, said second output terminal being connected to said second switch means to control the operation thereof, means for supplying a signal to said third switch means for controlling the operation thereof, said primary winding having a center tap connected to a suitable source of supply potential, a separate plurality of magnetic cores associated with each of said $n$ bi-stable elements, each of said cores being provided with at least a magnetizing winding and electrically operated switch means connected in series with said magnetizing winding, and a sensing winding, said series combinations of magnetizing winding and switch means being connected in parallel between the two end terminals of said secondary winding, each bi-stable element and the cores associated therewith forming a digit column, a plurality of address conductors to which signals for actuating said switching means may be supplied, each address conductor being coupled to a switch means in each of a plurality of said digit columns, means connecting said sensing windings in the same digit column in series relationship, said sensing windings of each digit column being so connected that a change in flux in any one of said magnetic cores of that digit column from the condition representing a "one" to a condition representing a "zero" produces a signal of a first polarity in said sensing winding circuit of that digit column, an "and" gate associated with each of said series connected sensing winding circuits, means for supplying a control signal to one input of each of said "and" gates, said series connected sensing windings being connected to a second input of the "and" gate associated therewith, said "and" gate being constructed and arranged to provide an output signal in response to a simultaneous application of said control signal and a signal from said sensing winding circuit, the output of said "and" gate being connected to the bi-stable element in the same digit column for causing said last-mentioned bi-stable element to be reset to indicate a "one" upon the occurrence of a signal at the output of said "and" gate.

11. A memory system for binary-coded information comprising $n$ pairs of signal conductors, where $n$ is the number of digits in the longest word to be stored, means for causing a difference in potential to exist between the two conductors of each pair, means for controlling selectively the polarity of said potential difference, a difference of one polarity representing certain information and a difference of the opposite polarity representing other information, a separate plurality of magnetic cores associated with each of said $n$ pairs of signal conductors, each of said cores being provided with at least a magnetizing winding, an electrically controlled switching means connected in series with said magnetizing winding, and a sensing winding, said series combinations of magnetizing windings and switching means being connected in parallel between the two signal conductors associated therewith, thereby to form a plurality of digit columns, a plurality of address conductors to which signals for controlling said switching means may be supplied, each address conductor being coupled to a switching means in each of a plurality of said digit columns, and means for connecting the said sensing windings in each of said digit columns in series relationship.

12. A memory system for binary-coded information comprising $n$ bi-stable elements, where $n$ is the number of digits in the longest word to be stored, each of said bi-stable elements having first and second output terminals, means for setting each of said bi-stable elements to represent selectively the binary digits "zero" and "one," the representation of a "one" being indicated by a difference in potential of a first polarity between said output terminals and the representation of a "zero" being indicated by a difference in potential of the opposite polarity between said output terminals, a separate plurality of magnetic cores associated with each of said $n$ bi-stable elements, each of said cores being provided with at least a magnetizing winding, an electrically controlled switching means connected in series with said magnetizing winding, and a sensing winding, said series combinations of said magnetizing windings and switching means being connected in parallel between said two output terminals of said bi-stable element associated with the corresponding plurality of cores, each bi-stable element and the cores associated therewith forming a digit column, a plurality of address conductors to which signals for controlling said switching means may be supplied, each of said address conductors being coupled to a switching means in each of a plurality of said digit columns, and means connecting said sensing windings in the same digit column in series relationship, said sensing windings of each digit column being so connected that a change in flux in any one of said magnetic cores of that digit column from the condition representing a "one" to a condition representing a "zero" produces a signal of a first polarity in said sensing winding circuit of that digit column.

13. A memory system according to claim 12, said memory system further comprising a plurality of "and" gates, one of said "and" gates being associated with each of said series-connected sensing winding circuits, means for supplying a control signal to one input of each of said "and" gates, each of said series connected sensing winding circuits being connected to a second input of said "and" gate associated therewith, each of said "and" gates being arranged to provide an output signal from the simultaneous occurrence of a control signal and a preselected signal from said sensing winding circuit associated therewith.

14. A memory system for binary coded information comprising *n* bi-stable elements, where *n* is the number of digits in the longest word to be stored, each of said bi-stable elements having first and second output terminals, means for setting each of said bi-stable elements to represent selectively the binary digits "zero" and "one," the representation of a "one" being indicated by a difference in potential of a first polarity between said output terminals and the representation of a "zero" being indicated by a difference in potential of the opposite polarity between said output terminals, a separate plurality of magnetic cores associated with each of said *n* bi-stable elements, each of said cores being provided with at least a magnetizing winding, a switching transistor having the collector-emitter circuit connected in series with said magnetizing winding, and a sensing winding, said series combinations of magnetizing windings and switching transistors being connected in parallel between said two output terminals of said bi-stable element associated with the corresponding plurality of cores, thereby to provide a plurality of digit columns, a plurality of address conductors to which an activating signal for said switching transistors may be supplied, each address conductor being coupled to the base of a transistor in each of said digit columns, means for connecting said sensing windings in the same digit column in series relationship, said sensing windings of each digit column being so connected that a change in flux in any one of said magnetic cores of that digit column from the condition representing a "one" to a condition representing a "zero" produces a signal of a first polarity in said sensing winding circuit of that digit column.

15. A memory system according to claim 14, said memory system further comprising a plurality of "and" gates, one of said "and" gates being associated with each of said series-connected sensing winding circuits, means for supplying a control signal to one input of each of said "and" gates, each of said series-connected sensing winding circuits being connected to a second input of said "and" gate associated therewith, said "and" gates being arranged to pass a signal upon the simultaneous occurrence of a control signal and a signal from said sensing winding circuit associated therewith.

16. A memory system for binary-coded information comprising a bi-stable element having first and second output terminals, means for setting said bi-stable element to represent selectively the binary digits "zero" and "one," the representation of a "one" being indicated by a difference in potential of a first polarity between said out-out terminals and the representation of a "zero" being indicated by a difference in potential of the opposite polarity between said output terminals, a plurality of magnetic cores associated with said bi-stable element, each of said cores being provided with at least a magnetizing winding, a switching transistor having the collector-emitter circuit connected in series with said magnetizing winding, and a sensing winding, said series combinations of magnetizing winding and switching transistors being connected in parallel between said two output terminals, a plurality of address conductors to which an activating signal for said switching transistors may be supplied, each address conductor being coupled to the base of one of said transistors, means connecting said sensing windings in series relationship, said sensing windings being so connected that a change in flux in any one of said magnetic cores from the condition representing a "one" to a condition representing a "zero" produces a signal of a first polarity in said sensing winding circuit.

17. A memory system according to claim 16, said memory system further comprising an "and" gate associated with said series-connected sensing winding circuit, means for supplying a control signal to one input of said "and" gate, said series connected sensing winding circuit being connected to a second input of said "and" gate, said "and" gate being arranged to pass a signal on the simultaneous occurrence of a control signal and a signal from said sensing winding circuit.

18. A memory system for binary-coded information comprising *n* bi-stable elements, where *n* is the number of digits in the longest word to be stored, each of said bi-stable elements having first and second output terminals, first means for setting each of said bi-stable elements to represent selectively the binary digits "zero" and "one," separately energizable means for setting all of said bi-stable elements to represent a selected one of said two values, "zero" and "one," the representation of a "one" being indicated by a difference potential of a first polarity between said output terminals and a representation of a "zero" being indicated by a difference in potential of the opposite polarity between said output terminals, a separate plurality of magnetic cores associated with each of said *n* bi-stable elements, each of said cores being provided with at least a magnetizing winding, a switching transistor having the collector-emitter circuit connected in series with said magnetizing winding, and a sensing winding, said series combinations of magnetizing windings and switching transistors being connected in parallel between said two output terminals of said bi-stable element associated with the corresponding plurality of cores, thereby to form a plurality of digit columns, a plurality of address conductors to which a signal for controlling the conduction through said switching transistors may be supplied, each address conductor being coupled to the base of a transistor in each of a plurality of said digit columns, means connecting said sensing windings in the same digit column in series relationship, said sensing windings of each digit column being so connected that a change in flux in any one of said magnetic cores of that digit column from the condition representing a "one" to the condition representing a "zero" produces a signal of a first polarity in said sensing winding circuit of that digit column.

19. A memory system according to claim 18, said memory system further comprising an "and" gate associated with each of said series-connected sensing winding circuits, means for supplying a control signal to one input of each of said "and" gates, means connecting each of said series connected sensing winding circuits to a second input of said "and" gate associated therewith, said "and" gate being arranged to provide an output signal on the simultaneous occurrence of a control signal and a signal in said sensing winding circuit associated therewith representative of the non-selected one of said two values.

References Cited in the file of this patent

"A Static Magnetic Memory System for the Eniac" by I. L. Auerbach, Proc. Assoc., Comp. Mach., May 1952, pp. 213–222.